(12) United States Patent
Lu

(10) Patent No.: US 6,317,517 B1
(45) Date of Patent: Nov. 13, 2001

(54) STATISTICAL PATTERN RECOGNITION

(75) Inventor: Liang Lu, Danvers, IL (US)

(73) Assignee: Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/201,593

(22) Filed: Nov. 30, 1998

(51) Int. Cl.[7] .............................. G06K 9/00; G06K 9/62; G06K 9/68; G06E 1/00
(52) U.S. Cl. .......................... 382/228; 382/115; 382/159; 382/160; 382/181; 382/224; 382/227; 706/20
(58) Field of Search ............................ 382/181, 115, 382/118, 133, 224, 226, 227, 228, 199, 240, 155, 159, 160; 706/20, 21, 45, 46

(56) References Cited

U.S. PATENT DOCUMENTS

| | | | | |
|---|---|---|---|---|
| 5,255,342 | * | 10/1993 | Nitta ...................................... | 704/200 |
| 5,287,275 | * | 2/1994 | Kimura .................................... | 707/5 |
| 5,754,681 | * | 5/1998 | Watanabe et al. ..................... | 382/159 |
| 5,828,776 | * | 10/1998 | Lee et al. .............................. | 382/133 |
| 5,841,669 | * | 11/1998 | Purvis et al. .......................... | 702/179 |
| 5,946,415 | * | 8/1999 | Su et al. ................................ | 382/190 |
| 5,982,912 | * | 11/1999 | Fukui et al. ........................... | 382/118 |
| 5,982,929 | * | 11/1999 | Ilan et al. .............................. | 382/200 |
| 6,038,337 | * | 3/2000 | Lawrence et al. ..................... | 382/156 |
| 6,101,275 | * | 8/2000 | Coppersmith et al. ............... | 382/226 |

OTHER PUBLICATIONS

Comon, et al. "ultimate performace of QEM classifiers", IEEE, pp. 1535–1537, 1996.*
Coifman, et al. "selection of best bases for classification and regression", IEEE p. 51, 1994.*

* cited by examiner

*Primary Examiner*—Leo Boudreau
*Assistant Examiner*—Daniel G. Mariam
(74) *Attorney, Agent, or Firm*—Milton D. Wyrick

(57) ABSTRACT

A method of performing statistical pattern recognition in a set of data having predetermined dimensions involving the steps of performing feature selection on the set of data to determine a selected feature; performing pattern recognition using the set of data with the selected feature to determine a recognized pattern; and outputting the recognized pattern.

1 Claim, 1 Drawing Sheet

Microfiche Appendix Included
(8 Microfiche, 72 Pages)

STATISTICAL PATTERN RECOGNITION

FIELD OF THE INVENTION

The present invention generally relates to pattern recognition and, more specifically, to statistical pattern recognition capable of reducing the dimensionality of real-life data. This invention was made with Government support under Contract No. W-7405-ENG-36 awarded by the U.S. Department of Energy. The Government has certain rights in the invention.

REFERENCE TO MICROFICHE APPENDIX

The Appendix to this application contains a computer listing in the C++ language that is used in the practice of the invention. Included are eight (8) microfiche, containing seventy-two (72) frames.

BACKGROUND OF THE INVENTION

The advent of improved pattern recognition procedures in recent years has opened a plethora of applications for this technique. Among these applications are medical diagnoses, biological categorization, financial market prediction, credit card fraud detection, retail transactions, insurance applications, and personal identification.

Statistical pattern recognition is theoretically well-founded when based on Bayes' decision rule. In practical applications, however, Bayes' decision rule is difficult to implement because real-world data is complex and multi-dimensional. This causes the amount of training data for statistical pattern recognition to rise exponentially with each additional data dimension.

It is well known that the dimension of real-life data can be reduced because these types of data often are highly redundant, and many of its components are irrelevant. The present invention addresses these issues and provides a statistical pattern recognition method that overcomes these problems through a combination of processes.

It is therefore an object of the present invention to provide a method of statistical pattern recognition that can identify relevant feature components.

It is another object of the present invention to provide a statistical pattern recognition method that capable of reducing the computer time required to run pattern recognition processes.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, a method of statistical pattern recognition in a set of data having predetermined dimensions comprises the steps of performing feature selection on the set of data to determine a selected feature; performing pattern recognition using the set of data with the selected feature to determine a recognized pattern; and outputting the recognized pattern.

DETAILED DESCRIPTION

Figure 1:
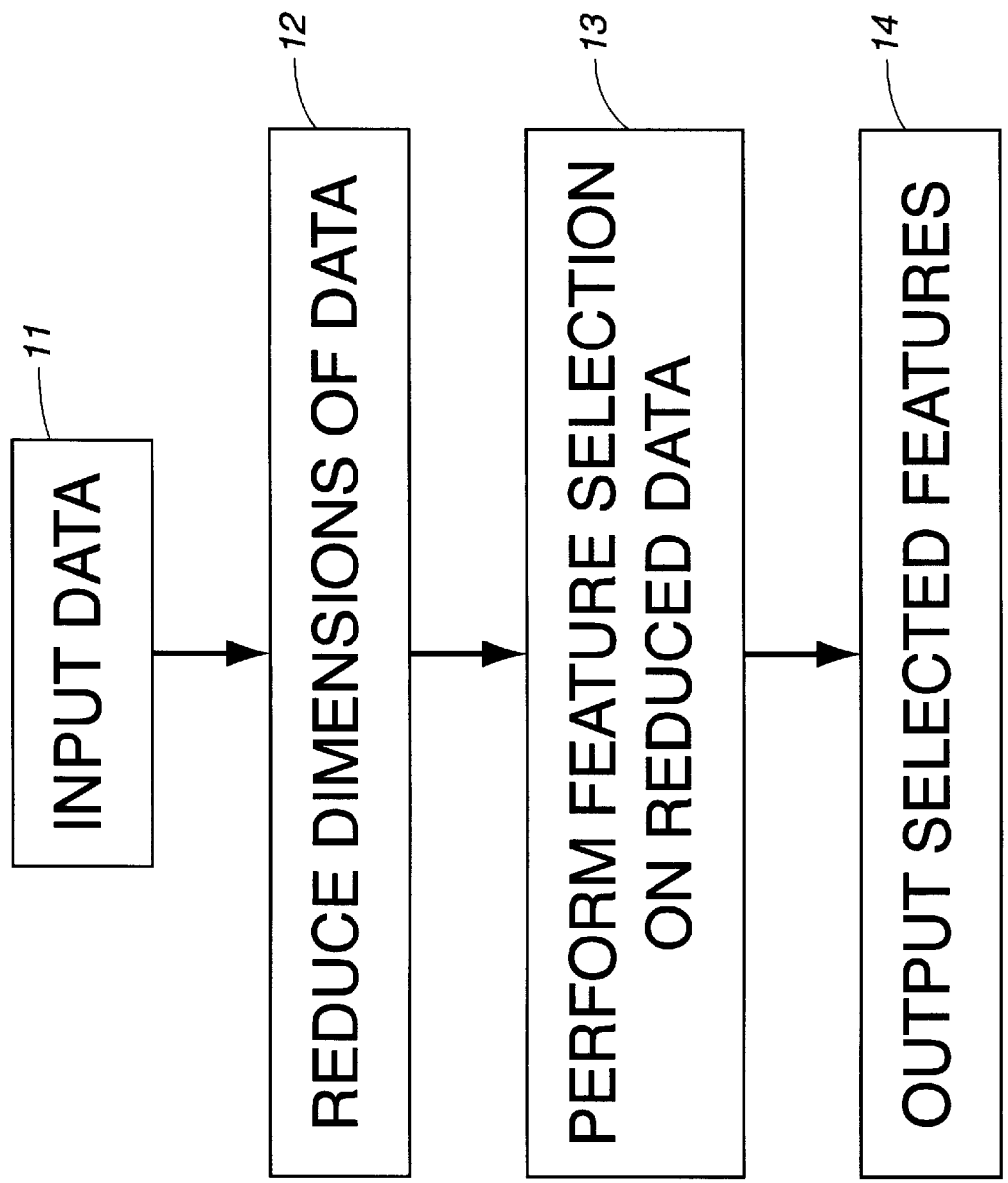
FIG. 1 a block diagram illustrating the steps involved in the practice of this invention.

The present invention provides improved statistical pattern recognition through the combination of prior art statistical processes. The invention may be understood most easily through reference to the drawing and to the following description.

Referring now to FIG. 1 there can be seen a block diagram of the steps involved in practice of the invention. as seen input data 11, having predetermined dimensions, is input to a computer (not shown). In the computer, the dimensions of input data 11 are reduced 12. After this dimensional reduction is completed, feature selection 13 is performed is performed on data 11, and the selected features 14 are output.

In this application, the training data is denoted by (C,X) or $X^C$, with unclassified data being X, and C being an integer class label, as $C=0,1,\ldots,N_C$, where $N_c$ is the number of classes in the data. X and $X^C$ are D dimensional vectors whose components, $X_\alpha$, or $X_\alpha^C$, where $\alpha=0,1,\ldots,D-1$, are real, ordered or categorical. For a real component, $X_\alpha \in (-,)$; for an ordered or categorical component, $X_\alpha-0,1,\ldots,\eta_\alpha-1$. For example, the expression $X_{j\alpha}^I$ denotes the $\alpha$-th component of the j-th element of training data in class i.

The goal of any statistical classification process is the prediction of the class label, C, for any unclassified data, X, by using the knowledge of a training data set. The basic assumption being that both the training data set and the unclassified data come from the same probability distribution, P(C,X).

Given a set of unclassified data, X, the probability of X being in a particular class, i, is:

$$P(i|X) = \frac{P(i,X)}{P(X)} = \frac{P(X|i)P(i)}{P(X)} \qquad 10$$

where P(X|i) is the probability density distribution conditioned on class i. P(i) is called the priori of class I; and P(i|X) is called the posteriori of class i when X is known. Bayes' decision rule holds that classifying the unclassified data, X, as class i, occurs if P(i|X) or P(X|i)P(I) is the largest among all P(C|X) or P(X|C)P(C) with $C=0,1,\ldots,N_C$. This rule is the necessary and sufficient condition for obtaining the smallest misclassification rate (MR) in a statistical pattern recognition process.

The most direct method of using a training set to estimate P(C) and P(X|C) for $C=0,1,\ldots,N_C$ is to use the kernel classifier (KC), where $$P(i) = \frac{\text{Number of training data in class } i}{\text{Number of training data}} \equiv \frac{N_i}{N} \qquad 11$$

and $$P(X \uparrow i) = \text{Kernal density estimation of training data in class i}, \qquad 12$$

because both the training data and the unclassified data come from the same probability distribution, P(C,X).

Kernel density estimation, a democratic process where the density estimation is completely driven by the training data, involves the probability density at a point X estimated for training data $X_j^I$ is $P(X,X_j^I)=\Pi_\alpha P_\alpha(X_\alpha,X_{j\alpha}^I, h)$, where i is the class label; j represents the j-th training data in class i; $\alpha$ represents the $\alpha$-th component; and $P_\alpha(X_\alpha,X_{j\alpha}^I,h)=k(d(X_\alpha,X_{j\alpha}^I),h)$ is the kernel probability density estimation of the component α. The functions d(,) and k(,) are chosen distance and kernel functions, respectively. The parameter, h, is the usual smoothing parameter. It should be noted that the product form of the kernel density estimation ensures that $$\int \Sigma P \mathcal{K}/(X, X^i_j, h) dX = 1, \qquad 13$$

where $\int$ is for real components, and $\Sigma$ is for ordered and categorical components.

The following equations define the distance and kernel functions for each component:

$$d(X_\alpha, X^i_{j\alpha}) = \frac{(X_\alpha - X^i_{j\alpha})^2}{\sigma_\alpha^2} \quad \text{for real or ordered components} \qquad 14$$

$$= 1 - \delta(X_\alpha, X^i_{j\alpha}) \text{ for categorical components}$$

$$k(d(X_\alpha, X^i_{j\alpha}), h) = \frac{1}{N_\alpha(h)} \exp\left(-\frac{d(X_\alpha, X^i_{j\alpha})}{2h^2}\right), \qquad 15$$

$$= \sqrt{2\pi\sigma_\alpha^2} h \qquad \text{for real components}$$

$$N_\alpha(h) = \sum_{j=0}^{j=n_\alpha-1} \exp\left(-\frac{j^2}{2\sigma_\alpha^2 h^2}\right) \quad \text{for ordered components}$$

$$= (\eta_\alpha - 1)\exp\left(-\frac{1}{2h^2}\right) + 1 \text{ for categorical components}$$

The distance function for real or ordered components is the square of the usual Euclidean distance scaled by its variance, $\sigma^2$. The distance function for categorical components is 0 if two categories are the same, and is 1 if they are different. The kernel for real components is the standard Gaussian kernel.

The kernel for ordered and categorical components is the discrete version of the Gaussian kernel. Choosing discrete Gaussian kernels for all components ensures that all components are treated "uniformly and democratically," without any bias, that is, the density estimation is completely driven by the training data. The smoothing parameter, h, characterizes the radius of influence of each element of the data. As the smoothing parameter becomes smaller, a smaller radius of influence will result. In general, the smoothing parameter can be chosen for each component or even for each set of training data. However, for the purposes of this description, only one smoothing parameter is used by assuming that any inhomogeneity is negated by dividing the distance function of each component by its variance.

The averaged probability estimation for all training data in class, i, is given by:

$$P(X | i) = \frac{1}{N_i} \sum_j P(X, X^i_j, h), \qquad 16$$

Where $N_r$ is the total number of training data in class i. The smoothing parameter, h, is the only parameter to be determined.

The smoothing parameter, h, is determined by minimizing the sum of the mean integrated square error (MISE) of all classes. It has been suggested that the best smoothing parameter $h_{best} = AN_r^{-1/4+d}$ where A is a constant of order 1. For classification problems, the primary concern is the minimizing of the misclassification rate (MR), rather than the sum of the MISE (SMISE).

In the case of a large sample of training data, the training set can be separated into a training set and a testing set. The training set is then used to build the kernel classifier (KC) and the testing set is used to obtain an honest MR as a function of the parameter A, MR(A), and to determine $A_{best}$ by minimizing MR(A).

Since the real-life data of interest is relatively small, or has relatively high dimensions, cross validation is used to obtain MR(A). Without the loss of any generality, the C++ computer program used to implement the present invention is listed in FIG. 1 A–F, and uses N-fold cross validation, where N is the total number of the training data. N-fold cross validation uses N−{$X_j^I$} data as the training set and the one remaining element of data $X_j^I$ as the testing set. The software builds a classifier with the training set (N−1) data and classifies the one data, $X_j^I$, with the classifier. If the classification is correct, that is, $X_j^I$ is classified as class I, then it follows that the misclassification of the data $X_j^I$, $M(x_j^I)$ is zero. If this is not true, then $M(X_j^I)$ is one. The "honest" estimation of the MR is given by:

$$MR(A) = \frac{\sum_{ij} M(X^i_j)}{N}. \qquad 17$$

As previously discussed, $A_{best}$ is determined by minimizing MR(A). Once $A_{best}$ is determined, the kernel classifier (KC) is established. It should be remembered that, in order to overcome most of the weaknesses of the kernel classifier, it is preferable to perform dimension reduction on the data before applying the kernel classifier.

In the present invention, all of the weaknesses of the kernel classifier can be overcome if the classification tree of the Classification and Regression Tree (CART) process is applied to the training data, with the result used to determine the relevant components of the data. The kernel classifier is then applied to the training data with its dimensions having been reduced by CART.

CART arrives at a relative importance (variable ranking, VR) of each component by evaluating each component's overall ability in reducing the impurity function, where the impurity function is a measure of the information contained in the classification tree. Minimizing the impurity function maximizes the information contained in the classification tree. A variable has a higher importance ranking if it is more able in reducing the impurity function or maximizing the information contained in the classification tree. It should be understood that in some implementations of CART, the impurity function corresponds to the logarithm of the maximum likelihood function, whose reduction has well-defined probability and information (entropy) meanings. In other implementations such as use of the Gini Index, the meanings are similar (information measures), but not as easy to interpret.

The present invention, which is called KART to recognize the combination of a kernel classifier with CART, has been tested on three sets of simulated data. Two of the sets, digit 24.10.1000 and waveform 21.3.800, are from the CART book (Wadsworth & Brooks/Cole Advanced Books & Software, 1984), and the third, attack 50.2.1000, is simulated data of computer violence. The notation used for data is [Data Name][Number of Dimensions].[Number of Classes].[Number of Records]. Accordingly, digit 24.10.1000 has 24 components, 17 of which are irrelevant noise, 10 classes corresponding to 10 digits, and 1000 records. Waveform .21.3.800 has 21 components corresponding to 21 grid points, 3 classes corresponding to 3 waveforms, and 800 records. Attack.50.2.1000 has 50 components, 2 classes sponding to COMPUTER ATTACK and NO COMPUTER ATTACK, and 1000 records. The results of the simulation are summarized in Tables I, II and III below.

TABLE I

Miscalculation Rate of Ideal Bayes, CART, KC, and Kart

| Data | Ideal Bayes | CART | KC | KART-VR | KART-NODES |
|---|---|---|---|---|---|
| Digit | .26 | .28 | .29 | .23 | .23 |
| Waveform | .14 | .30 | .21 | .22 | .22 |
| Attack | Unknown | .13 | .22 | .07 | .10 |

KART-VR uses components whose variable rankings (VR) are above 20 (the maximum is 100). KART-NODES uses variables that appear in nodes of the tree construction.

TABLE II

Effective Dimension of KC and KART

| Data | KC | KART-VR | KART-NODES |
|---|---|---|---|
| Digit | 24 | 7 | 10 |
| Waveform | 21 | 18 | 9 |
| Attack | 50 | 13 | 12 |

Experience has shown that the Central Processing Unit (CPU) capacity required is proportional to the dimension of the data. Table II is easily converted into Table III, where it is shown that CART is many times faster than the KC, where the CPU of CART is represented by zero. Other CPUs are compared with the CPU of the KC, which is represented by one.

TABLE III

Relative CPU of CART, KC and KART

| Data | CART | KC | KART-VR | KART-NODES |
|---|---|---|---|---|
| Digit | 0 | 1 | .29 | .42 |
| Waveform | 0 | 1 | .86 | .43 |
| Attack | 0 | 1 | .26 | .24 |

For the digit data, KART, of the present invention, has a lower MR (23%) than both CART and the KC. The effective dimensions and CPUs of KART-VR of the present invention are 29% of that of the KC, and with KART-NODES are 42% of that of the KC. KART-VR has a lower effective dimension of 7, which eliminates all irrelevant noise components in the data. It should be noted that, although the miscalculation rate of 23% is lower than the miscalculation rate of the ideal Bayes, it is within the 3% error rate.

With regard to the waveform data, the miscalculation rate of KART, the present invention, is comparable to that of the KC, implying that there is no irrelevant component in this data. Additionally, the effective dimensions and CPU usages of the KC are 89% of the KART-VR and 43% of the KART-NODES results. In practice, when the miscalculation rates of KART-VR and KART-NODES are comparable, the method having the higher dimension reduction should be favored because that method contains fewer redundant components. For the described testing, KART-NODES is favored, although its miscalculation rate is higher than the rate for the ideal Bayes. It is likely that this result can be improved if the number of independent smoothing parameters in the KC is increased.

In the case of the attack data, the miscalculation rate of KART is lower than those of the KC and CART individually.

Also, KART-VR has a lower miscalculation rate than KART-NODES. Although KART-VR may have more redundant components than KART-NODES, the lower miscalculation rate indicates that these redundant components help to reduce the miscalculation rate. This may mean that nonlinearly related components may exist that should be retained for lowering of the miscalculation rate.

The present invention, in their combination, combines the best features of the KC AND CART. The present invention, KART, has lower miscalculation rates than either the KC or CART, alone, and is faster than the KC.

Testing of the present invention also has been done using tree functions in Splus. Splus uses the deviance or the logarithm of the maximum-likelihood function rather than the Gini index. Since Splus tree functions do not contain information about variable rankings, only KART-NODES implemented with the Splus tree function can be used. The results obtained are similar, but not quite as good as those obtained with KART-NODES through use of CART. However, this is not overly surprising, since the choice of the impurity function is not important, but the choice of the stopping rule is very important.

The application of CART in the present invention to determine the relevant feature components provides a method of accomplishing feature selection. The purpose of feature selection is to lower the miscalculation rate, or lessen the computational burden, or both. Therefore, to do feature selection, an effective classifier is needed to evaluate miscalculation rates for different combinations of feature components. For a classification problem having "D" dimensional feature vectors, one can imagine a step-wise procedure to exhaust all combinations of feature components.

Assuming the use of the miscalculation rate of the KC as the evaluation function, the CPU of obtaining the miscalculation rate is proportional to the number of feature components used. Therefore, the total CPU in the use of this approach is on the order of:

$$\sum_{i=1}^{i=D} i C_D^i \approx D 2^D. \qquad 18$$

The CPU computational load increases at least exponentially with the dimension, D. For a large data set, the computational load is formidable for classifiers such as the KC. The CPUs of standard sub-optimal feature selectors are at least of the order $D^3$. This means that, with reasonable qualitative dimension reductions, doing feature selection with the KC is unnecessary.

This is the reason that CART is such a good non-parametric, nonlinear, and qualitative classifier for dimension reduction that can be applied to all types of variables, whether real, ordered, categorical, or missing types. When using CART for feature selection, it is not necessary to try all combinations of variables. It is necessary only to try at most "D" combinations because the inclusion of lower ranking variables allows the selection of the combination giving an acceptable miscalculation rate (evaluated by the KC), with the minimum number of feature components.

If the quantity of CPU used by CART is neglected, the CPU used for feature selection is at most of the order of $D^2$ in the case of an exhaustive search or DlogD if a golden-rule type search is used. In actual practice, the CPU required can be lower than this estimate. As previously noted, the selection of variables whose variable rankings are greater than 20 or who appear in the tree construction has worked remarkably well. It will be recognized by those skilled in this art that CART, as opposed to many other feature selection methods, is ideally suited for dimension reduction because it is a good classifier, and because it accomplishes feature selection during the process of classification.

In those cases where the variable rankings determined by CART do not truly reflect the relative importance of each feature component because of strong interactions among feature components, it is most likely still a good assumption that the lowest ranking feature components are essentially irrelevant or redundant. Therefore, after eliminating these low-ranking feature components (either by the greater than 20 rule, or the splitting rule, both described above) the variable rankings of the remaining components can be ignored, and standard feature selection methods such as the branch and bound (BB) type algorithms can be used to search for the optimal feature subset.

Absent the preliminary dimension reduction by CART, the monotonicity property required by the BB logarithm, when the miscalculation rate is used as the evaluation function, cannot be satisfied because of the presence of irrelevant and/or redundant feature components. Thus, CART is at least a good first cut for doing feature selection because it can reduce the feature dimension, and prepare the data for further optimal feature selection if desired.

It should be recognized that KC is not the only classifier that can be used after feature selection by CART. Other classifiers such a k-nearest-neighbor (kNN), linear discriminate analysis (LDA), quadratic discriminate analysis (QDA), neural networks (NN), and even CART itself could be used with varying degrees of success. It is expected that CART will improve the performance of these other classifiers as well. However, given sufficient computational capacity, the KC appears to be the best choice. Similarly, other decision trees, such as C4.5, can be used for feature selection.

The process of the present invention is implemented in the $C^{++}$ programming language. A listing of the software program is provided in a microfiche appendix hereto, which microfiche appendix is included herein for all purposes.

The present invention likely will find application in many diverse fields where detection of certain patterns is important. Among these applications are medical diagnoses, biological categorization, financial market prediction, credit card fraud detection, retail transactions, insurance applications, including fraud detection, and personal identification.

The foregoing description of the preferred embodiments of the invention have been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. A method of statistical pattern recognition in a set of data having predetermined dimensions comprising the steps of:

performing feature selection on said set of data to determine a selected feature, using a Classification and Regression Tree (CART) process to determine said selected feature;

performing pattern recognition using said set of data with said selected feature to determine a recognized pattern, wherein said pattern recognition involves the use of a kernel density estimation process, which is a democratic classification process where the density estimation is completely driven by said set of data; and outputting said recognized pattern.

* * * * *